United States Patent

[11] 3,613,678

| [72] | Inventor | Delbert J. Mayhew<br>White Bear Lake, Minn. |
| --- | --- | --- |
| [21] | Appl. No. | 14,210 |
| [22] | Filed | Feb. 24, 1970 |
| [45] | Patented | Oct. 19, 1971 |
| [73] | Assignee | Minnesota Mining and Manufacturing Company<br>Saint Paul, Minn.<br>Continuation-in-part of application Ser. No. 623,369, Mar. 15, 1967, now abandoned. |

[54] FILTRATION MASK
10 Claims, 3 Drawing Figs.

[52] U.S. Cl. .................................................. 128/146.2,
55/512
[51] Int. Cl. ..................................................... A62b 23/06
[50] Field of Search ......................................... 128/139–141,
145–146.3, 146.6, 146.7, 296, 147,
156; 55/512, 522, 527, 528

[56] References Cited
UNITED STATES PATENTS

| 2,689,199 | 9/1954 | Pesce | 55/528 |
| --- | --- | --- | --- |
| 2,910,763 | 11/1959 | Lauterbach | 127/296 |
| 3,069,831 | 12/1962 | Young et al. | 55/527 |
| 3,220,409 | 11/1965 | Liloia et al. | 128/146.2 |
| 3,285,245 | 11/1966 | Eldredge et al. | 128/156 |
| 3,316,904 | 5/1967 | Wall et al. | 128/146.6 |

FOREIGN PATENTS

| 871,661 | 6/1961 | Great Britain | 128/139 |
| --- | --- | --- | --- |

*Primary Examiner*—Charles F. Rosenbaum
*Attorney*—Kinney, Alexander, Sell, Steldt & Delahunt ABSTRACT: A face mask having high and prolonged filtering efficiency specially adapted for surgical use formed from a filtering web composed entirely of synthetic organic fibers including filtering fibers 0.5 to 6 microns in diameter and a nonfuzzy face contacting layer formed from a porous smooth-surfaced thermoplastic film.

PATENTED OCT 19 1971 3,613,678

INVENTOR.
DELBERT J. MAYHEW
BY
Carpenter, Kinney & Coulter
ATTORNEYS

FILTRATION MASK

This case is a continuation-in-part of my copending application Ser. No. 623,369, filed Mar. 15, 1967 now abandoned.

This invention relates to face masks having high and prolonged filtering efficiency, particularly suitable for use as surgical masks.

The surgical face masks which have been standard for decades and which are in wide usage even today are composed of layers of gauze covering the nose and mouth. Even though the bacteria filtration efficiency of such masks is quite low initially and becomes even lower after a very short wear period, these masks have been widely used because they are easy to breathe through. Substitute material such as foamed rubbers, or nonwoven webs formed from conventional synthetic organic fibers, have suffered from these same disadvantages. Substitute materials incorporating small diameter inorganic fibers, such as asbestos or glass, while providing good breathing and filtering characteristics, tend to present health hazards due to the possibility of inhalation of small inorganic particles. Furthermore, even very fine glass fibers, e.g. 3 or 4 microns in diameter, can cause skin irritation. The use of very fine organic fibers has not been found practical prior to the present invention because webs made therefrom tended to be difficulty handleable and uncomfortable due to fuzziness of the material; or if made more coherent by heat and pressure tended to present too high a resistance to breathing.

The present invention provides face masks having high and prolonged filtering efficiency. The masks of this invention are sufficiently economical to be disposable after use. These masks combine high filtering efficiency with wearing and breathing comfort, avoidance of fuzziness or other skin irritating properties, and the avoidance of the hazard of inhaling irritating particles. The masks of this invention combine a filtering layer formed from tiny synthetic organic fibers which provide high small-particle filtering efficiency and yet have enough void volume to provide ease of breathability or low resistance to air flow in combination with a smooth very porous fuzz-free, tear-resistant, moisture-resistant surface layer for contacting the face. The inner, face-contacting surface layer is nonabsorbent, and thus allows moisture and other small particles to pass therethrough without becoming wet to the touch, even after prolonged wear. Masks of this invention are free of objectionable odors and in finished form are preferably substantially free of solvents or odor causing adhesives. Due to the nature of the preferred synthetic organic polymeric materials, the masks of this invention are resistant to deterioration from the moisture normally present in exhaled air. Preferably the outer side of the mask is also covered by a porous fabric. These layers are preferably held together only around the edges, but could also be fastened together at other points if desired. The mask is provided with tie strings, elastic, or the like, to hold the filtering portion of the mask over the user's nose and mouth and is preferably provided with a strip of soft deformable metal or the like along the edge of the mask designed to cover the user's nose, to provide a close fit which minimizes leakage of exhaled air around the edge of the mask.

The invention will be further explained with reference to the accompanying drawings wherein.

Figure 1:
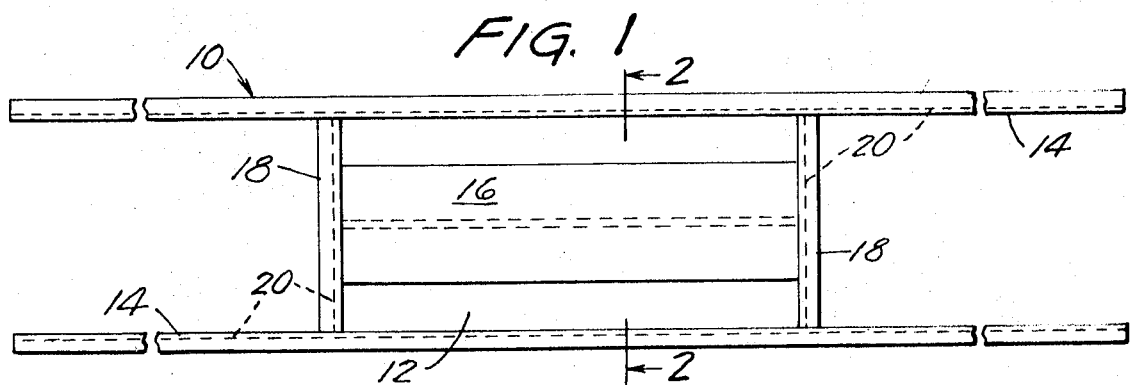
FIG. 1 is a perspective view of a mask of the present invention.

Face mask 10 consists of a central, usually rectangular body portion 12 intended to cover the lower portion of the face of the user. The mask is further provided with ties 14 at the ends thereof for securing the mask over the face of the user. A pleat 16 may be formed in the body portion of the mask to permit unfolding or widening thereof to cover generally the nose, mouth, and chin of the user. In the folded condition the mask is more compact for packaging, shipment and storage. Edge binding 18 may be conveniently used to hold the layers forming the body portion 12 of the mask together, as well as holding in place the ends of the pleat 16. The ties 14 may also be extensions of the edge binding 18, or may be separate fabric or elastic strips if desired. Stitching 20 is a preferred means of holding the edge binding and layers of the mask body portion in place. Heat sealing, adhesives, or tapes and the like could also be used.

Figure 2:
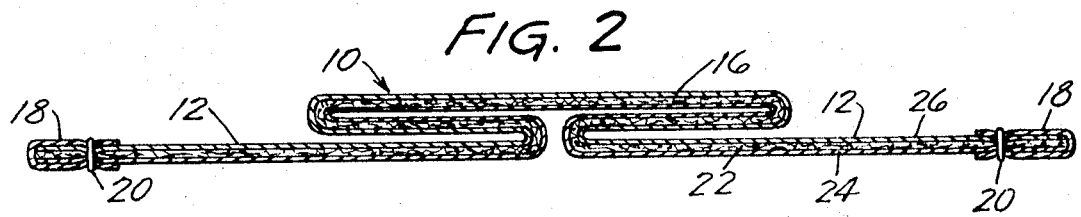
FIG. 2 is a cross-sectional view of the mask of FIG. 1 taken along line 2—2.
Figure 3:
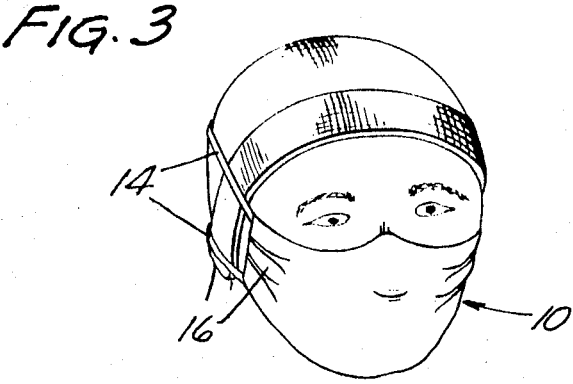
FIG. 3 is a perspective view showing a mask of this invention in use.

As seen in FIG. 2, body portion 12 of the mask is preferably formed of three layers. The central layer is filtering web 22, a web of tiny thermoplastic organic fibers. A surface of filtering web 22 is superimposed upon a surface of face contacting layer 24. Face contacting layer 24 is a thin soft flexible self-sustaining nonabsorbent highly porous discontinuous film of fused and coalesced nonwoven, inert, thermoplastic, synthetic polymeric fibers. The face contacting surface of layer 24, i.e. the exposed surface, is the surface opposite to the inner surface which contacts filtering web 22. This exposed surface feels smooth and is skinlike in nature. The outer layer 26 of the mask may be formed from any porous fabric, woven or nonwoven. In an alternative form of this invention, the outer layer 26 is omitted. Outer layer 26 is less essential than face contacting layer 24, since fuzziness and even loss of filtering fibers from the resulting exposed side of filtering web 22 will not seriously annoy or inconvenience the user. However, it is preferred to include outer layer 26.

Filtering web 22 is formed from long, very fine synthetic organic fibers having an average diameter of about 0.5 to 6 microns, the very best combination of filtering efficiency and breathability being obtainable with fibers having average diameters of 1 to 3 microns. Preferably these fibers are in the form of loosely held-together bundles or "ropes," because in this form of the fibers are much more resistant to matting together or compaction into a dense paperlike form which would cause excessive resistance to air flow through the web. Alternatively, the individual tiny fibers can be mixed with larger polymeric fibers which serve to prevent undue compaction.

The tiny fibers are preferably formed in accordance with the procedure described in Naval Research Laboratory Report No. 111,437, dated Apr. 15, 1954, entitled "Manufacture of Superfine Organic Fibers." This procedure involves extruding a fine stream of molten polymeric material into a stream of heated air or other fluid which causes a breakdown or attenuation of the extruded material into tiny fibers. Fibers of this type are known in the art as "sprayed" or "blown" fibers. They are always staple rather than continuous, because they are broken into lengths on the order of about 0.5 to about 20 cm. Preferred polymers for forming such sprayed fibers for face masks include polypropylene, polyethylene, polyesters, polyamides such as nylon, polycarbonates, polyphenylene oxide, and fluorinated polymers such as trifluorochloroethylene. Other nonabsorbent, slippery feeling hydrophobic thermoplastic polymers may also be used. The fiber diameter rather than the composition appears important in providing filtering characteristics so long as the material is relatively moisture-insensitive, odor-free, and dimensionally stable under ambient conditions. The fibers should have a minimum length of about 0.5 cm. to avoid loosening or breaking off of short fragile fiber fragments which could cause irritation to the wearer if inhaled. Fibers of this length also assist in forming a web which is sufficiently coherent to be handled. The fibers are generally found to be raveled and intertwined sufficiently to provide a web which is sufficiently dimensionally stable. It has been found that loosely raveled bundles or "ropes" of fiber can be obtained by collecting the fibers at a distance of 20 to 40 inches (about 50 to 100 cm.) from the nozzle orifice. These bundles of ropes provide a web with good cohesiveness and filtering characteristics. Alternatively, a closer collection point can be used whereby the fibers tend to mat as individual fibers rather than bundles or ropes. These mats may tend to be somewhat more compacted than the mats comprising bundles or ropes, but nevertheless are suitable for use in this invention.

It is somewhat surprising that a 100 percent fine fiber (fibers less than 6 microns and preferably less than 3 microns in diameter) web is so cohesive and so porous, particularly in view of the fact that the web is preferably collected and combined with the other elements of this invention substantially as is. That is, the filtering web is not subjected to special internal bonding procedures, e.g. hot pressing. Furthermore, it would be expected that the fine fibers might become unduly compacted, even in the absence of heat or pressure. Apparently the sprayed fibers are tacky enough to spontaneously bond tenaciously to one another without further heating or other treatment. This tackiness and self-bonding causes the formation of a web of extremely fine staple fiber which, even when the fibers are individual rather than intertwined into bundles or ropes, does not require the use of coarser reinforcing fibers to insure either cohesiveness or porosity.

In order to provide the needed ease of breathability, the filtering web should have a void volume of at least about 87 percent. The ease of breathability can be correlated with the pressure drop which occurs when air is forced through the filtering portion of the web at a controlled rate. As a standard test for checking the suitability of webs for use in practicing the invention, a disc of the filtering material 3 1/16th inch in diameter is used, and air is pumped through the material at a flow rate of 1 cubic ft. per minute. The difference in air pressure between one side of the filtered disc and the other is measured with a manometer in a conventional manner. The pressure drop (measured in inches of water) should be in the range of about 0.15 to 0.85 inches $H_2O$. Filters causing a pressure drop under these conditions of less than 0.15 are found to have poor filtering efficiency, while those causing a pressure drop of over about 0.85 are unacceptable because of difficulty in breathing through a mask formed therefrom. Optimum results were obtained using webs which caused a pressure drop of 0.15 to 0.5 inches $H_2O$.

The characteristics of the mask are also affected by the thickness or density of the filtering material. It is a feature of this invention that a very low density mask can be made without sacrificing any other needed properties such as filtering efficiency. It is preferred for comfort and breathability that the ream weight (the weight of 320 square yards of material) of the filtering material be substantially less than 55 pounds. Fibers such as polypropylene are very low in density, and a 10 or 15 lb./320 sq. yd. filtering material can be made, though with difficulty, from such fibers. Ream weights less than 30 lb./320 sq. yd., e.g. 20–25 lb./320 sq. yd. are readily achieved in practice and are practical from a manufacturing standpoint.

The inner face-contacting layer can be constructed by forming a nonwoven layer of randomly oriented thermoplastic fibers, and subjecting the matting to a heat treatment (e.g. about 300° F. (149° C.) in the case of polypropylene) sufficient to soften the fibers and cause them to adhere to one another to form a self-sustaining web. This web is then further treated to form a smooth surface free of fuzz or other irregularities by pressing it against a smooth heated surface such as that of a heated drum or roller. Backup pressure rollers or similar means can be used to insure that the matting is uniformly pressed against the surface of the drum. The temperature of the heated smooth surface should be sufficient to cause melting of the surface fibers of the matting, and sufficient flow to form a smooth flat surface without losing their fibrous form. The fused fibers are then coalesced in this smooth condition. In the case of polypropylene, a temperature of about 330° F. (166° C.) is suitable. Other smooth heated surfaces, such as traveling belts or the like, can be used instead of the heated drum. This treatment of the matting produces a surface having a smooth fuzz-free feel, while yet maintaining the porous discontinuous nature of the film. The film should have an average of about 10 to 40 holes per square millimeter of surface, and the holes preferably have an average area of 0.1 square millimeter or less, and constitute 10 to 40 percent of the total area of the surface, and preferably 20 to 30 percent thereof. The large number of tiny irregularly shaped holes permits easy flow of air through the layer and thus provides for easy breathability while forming a containing envelope for the filtering web which prevents inhalation of loose fibers or irritation due to skin contact with the filtering layer. The thermoplastic fibers from which the layer is formed should be no greater than about 4 denier and preferably are 3 denier fibers, and the resultant face-contacting layer has a weight of 3.1 to 12.9 grains per 24 square inches (0.0013–0.0054 grams per square centimeter), and preferably from 4 to 6 grains per 24 square inches (0.0016 to 0.0025 grams per square centimeter). The absence of adhesives or binder resins in the web avoids odors normally found in webs bonded by the use of such means.

The invention will be further explained with reference to the following example in which all parts are given by weight, unless otherwise indicated.

EXAMPLE

A filtering web made up of bundles of microfine polypropylene fibers was formed. A polypropylene resin having a melting point of 333° F. (168° C.) was extruded through an orifice having a diameter of 0.020 inch. The extruder was operated at a temperature of 700° F. (371° C.), the extrusion die temperature being 560° F. (293° C.). The extruder was operated at a rate of 14 lbs. (6.35 kg.) of resin per hour. The resin emerging from the die was immediately blasted with hot air at 800° F. (427° C.), which was discharged from a -inch (1.9 cm.) opening at a pressure of 5 p.s.i. (0.34 atmospheres). The web was collected at a rate of 21 ft. per minute (6.4 meters per minute) at a distance of about 38 inches from the extrusion die. The fibrous web thus collected consisted of loosely raveled bundles or "ropes," of tiny individual fibers having diameters of 0.5 to 3 microns, and an average diameter of about 1.5 microns.

A face contacting web was also formed from polypropylene. Three denier polypropylene stable fibers were formed into a nonwoven matting, using conventional apparatus. The matting had a weight of 5 to 7 grains per 24 square inches (0.0021 to 0.003 grams per square meter). The matting was passed over a smooth surfaced heated drum having a surface temperature about 330° F. (166° C.) using a pressure roller to compact the matting to insure uniform heat transfer to the surface of the matting. The fibers nearest the surface of the drum melted, but retained their fibrous form. On coalescing, a smooth non-fuzzy surface having a human-skinlike appearance with a myriad of tiny pores or holes therethrough was formed.

An outside cover web for the mask was formed from rayon fibers. 1.5 denier viscose rayon fibers were processed on a garnet machine which formed a fluffy nonwoven web having fibers more or less aligned in the direction the web traveled. The following binding solution was applied by means of a compacting wool roller to bind the rayon web into a relatively tear-resistant form:

|   | Parts |
|---|---|
| Polyvinyl alcohol (Shawanigan Gelvatol 20–60) | 50 |
| Water | 600 |
| Blue pigment | 0.44 |
| Green pigment | 0.26 |
| Urea-formaldehyde resin | 10 |
| $Al_2(SO_4)_3$ | 2 |

The urea-formaldehyde resin and the $Al_2(SO_4)_3$ serve to insolubilize the polyvinyl alcohol resin, providing a fuzz-free surface, and also bind the pigments to the web, preventing color bleeding. Upon drying, the web had no perceptible odor.

Rectangular pieces of the three webs were assembled with the filtering web sandwiched between the facing webs. Strips of the rayon cover web were folded over to form narrow strips about 1.6 cm. in width. These strips were then folded around the edges of the assembled webs and stitched into place as shown in the drawings. The edge binding was extended about 15 inches (38 cm.) beyond each side of the top and bottom edges of the mask body to provide tie strings. A 3/16th inch (0.48 cm.) wide double layer of aluminum foil backed pressure sensitive adhesive tape about 6 inches (15 cm.) long was enclosed in the binding along the major portion of one edge to form a deformable nose band which will retain the shape of the user's face contour to minimize air leakage.

The masks, when worn with the polypropylene facing web against the wearer's face, were comfortable, provided ease of breathability, and did not interfere with normal conversation. The mask was tested for efficiency on a capped masked human subject, in accordance with the Greene-Vesley in vivo method described in the *Journal of Bacteriology*, Vol. 83, No. 3, Mar. 1962, pp. 663–667. The subject's head was placed in an enclosed chamber and any expelled moisture droplets collected on agar-agar. The mask had an efficiency of 97.7 percent as defined by this in vivo test method.

What is claimed is:

1. In a face mask having a body portion adapted to cover the nose and mouth and means for securing said body portion over the nose and mouth, the improvement wherein said body portion comprises:
   a face contacting web comprising a nonwoven, porous, self-sustaining, flexible, fibrous matting having an exposed smooth, fuzz-free surface, said exposed surface having an average of about 10 to 40 holes per square millimeter of surface, said holes having an average area of less than about 0.1 square millimeter and constituting 10 to 40 percent of the area of said surface;
   a porous filtering web consisting essentially of intertwined thermoplastic organic fibers, said fibers being uniformly distributed through said filtering web and having diameters ranging from 0.5 to 6 microns;
   said porous filtering web being superimposed upon the surface opposite said exposed smooth fuzz-free surface of said face contacting web.

2. A face mask according to claim 1 wherein said body portion of said mask includes a retaining layer, said retaining layer comprising a porous fabric; said face contacting web, said porous filtering web, and said retaining layer being arranged such that said filtering web is contained between
   said surface opposite said exposed smooth fuzz-free surface of said face contacting web and
   a surface of said retaining layer.

3. A face mask according to claim 1 wherein said thermoplastic organic fibers are polypropylene fibers.

4. A face mask according to claim 1 wherein said thermoplastic organic fibers have an average diameter of 1–3 microns and a length of at least ½ centimeter.

5. A face mask according to claim 1 wherein the said exposed surface of said face contacting web consists of thermoplastic fibers fused together at their points of contact with each other and coalesced while retaining their fibrous form, thus forming numerous irregularly shaped tiny openings in said exposed surface to permit easy breathing therethrough.

6. A face mask according to claim 1 wherein: the void volume of said filtering web is at least about 87 percent, and the weight per unit area of said filtering web is less than about 55 pounds per 320 square yards.

7. A face mask according to claim 6 wherein said weight per unit area is less than about 30 pounds per 320 square yards.

8. A face mask according to claim 6 wherein the pressure drop caused by said filtering web ranges from about 0.15 to 0.85 inches of water when air is pumped through a 3 1/16th inch diameter disc of said filtering web at a flow rate of 1 cubic foot per minute.

9. A face mask according to claim 8 wherein said pressure drop is about 0.15 to about 0.5 inches of water.

10. In a face mask having a body portion adapted to cover the nose and mouth and means for securing said body portion over the nose and mouth, the improvement wherein said body portion comprises:
    a face contacting web comprising a nonwoven porous, self-sustaining, flexible, fibrous matting having an exposed smooth, fuzz-free surface, said exposed surface having an average of at least 10 holes per square millimeter of surface, said holes having an area of less than 0.1 square millimeter and constituting at least 10 percent of the area of said surface;
    a porous filtering web having a void volume of at least about 87 percent and a ream weight of less than 55 pounds per 320 square yards of area and consisting essentially of intertwined thermoplastic organic fibers, said fibers being uniformly distributed through said filtering web and having diameters ranging from 0.5 to 6 microns; said porous filtering web being superimposed upon the surface opposite said exposed smooth fuzz-free surface of said face contacting web.

UNITED STATES PATENT OFFICE
CERTIFICATE OF CORRECTION

Patent No. 3,613,678       Dated October 19, 1971

Inventor(s) Delbert J. Mayhew

It is certified that error appears in the above-identified patent and that said Letters Patent are hereby corrected as shown below:

Column 4, line 28 (in the Example), the figures "3/4" have been omitted before "-inch" at the end of the line. If properly inserted, the phrase would read -- which was discharged from a 3/4-inch -- .

Signed and sealed this 6th day of March 1973.

(SEAL)
Attest:

EDWARD M. FLETCHER, JR.       ROBERT GOTTSCHALK
Attesting Officer      Commissioner of Patents